(12) United States Patent
Chen et al.

(10) Patent No.: US 9,149,767 B2
(45) Date of Patent: Oct. 6, 2015

(54) ZERO POLLUTION RECOVERY SYSTEM FOR SAFELY PRODUCING ANHYDROUS FLUORINE HYDRIDE

(75) Inventors: Xuemin Chen, Guangdong (CN); Qingdong Ye, Guangdong (CN); Yueming Yu, Guangdong (CN); Sihai Zhou, Guangdong (CN); Jun Yang, Guangdong (CN); Zhi Zhou, Guangdong (CN)

(73) Assignee: SHENZHEN SUNXING LIGHT ALLOYS MATERIALS CO., LTD., Shenzhen, Guangdong (CN)

( * ) Notice: Subject to any disclaimer, the term of this patent is extended or adjusted under 35 U.S.C. 154(b) by 514 days.

(21) Appl. No.: 13/504,686

(22) PCT Filed: Nov. 21, 2011

(86) PCT No.: PCT/CN2011/082565
§ 371 (c)(1),
(2), (4) Date: Apr. 27, 2012

(87) PCT Pub. No.: WO2012/126251
PCT Pub. Date: Sep. 27, 2012

(65) Prior Publication Data
US 2012/0321522 A1 Dec. 20, 2012

(30) Foreign Application Priority Data

Oct. 31, 2011 (CN) .......................... 2011 1 0337061

(51) Int. Cl.
*B01D 53/18* (2006.01)
*C01B 7/19* (2006.01)
*B01D 53/78* (2006.01)
*B01D 53/68* (2006.01)
(Continued)

(52) U.S. Cl.
CPC ................ *B01D 53/78* (2013.01); *B01D 53/68* (2013.01); *C01B 7/191* (2013.01);
(Continued)

(58) Field of Classification Search
CPC ........ C01B 7/191; B01D 53/68; B01D 53/78; B01D 53/1406; B01D 53/1456; B01D 53/18; B01D 2251/104; B01D 2252/10; B01D 2257/2047; B01D 2258/02
USPC ................... 422/117, 119, 187, 168; 423/483
See application file for complete search history.

(56) References Cited

U.S. PATENT DOCUMENTS 3,421,853 A 1/1969 Hennig
4,938,935 A * 7/1990 Audeh et al. .............. 423/240 R
(Continued)

FOREIGN PATENT DOCUMENTS

CN 101214926 7/2008
CN 101601957 12/2009
CN 201873515 6/2011

*Primary Examiner* — Jill Warden
*Assistant Examiner* — Joye L Woodard
(74) *Attorney, Agent, or Firm* — Jackson IPG PLLC; Demian K. Jackson

(57) ABSTRACT

The present invention provides a zero pollution recovery system for safely producing anhydrous fluorine hydride, comprising: a compartment, a reactor for producing fluorine hydride, and a water pool; the reactor is disposed in the compartment; the water pool is disposed at the bottom of the compartment; absorption hoods are respectively disposed above both ends of the reactor for absorbing fluorine hydride gas; at least two absorption towers mutually connected in series via pipes are disposed above the compartment; water pipes connected with the water pool are respectively disposed at the top and bottom of the absorption tower; and a cooler and a receiver connected with the water pool is disposed on the pipes. The present invention has the advantages of being able to control the range over which fluorine hydride can diffuse.

11 Claims, 2 Drawing Sheets

(51) Int. Cl.
 *B01D 53/14* (2006.01)
(52) U.S. Cl.
 CPC ........ *B01D 53/1406* (2013.01); *B01D 53/1456* (2013.01); *B01D 53/18* (2013.01); *B01D 2251/404* (2013.01); *B01D 2252/10* (2013.01); *B01D 2257/2047* (2013.01); *B01D 2258/02* (2013.01)

(56) References Cited

U.S. PATENT DOCUMENTS

| | | | | |
|---|---|---|---|---|
| 5,465,536 | A | * | 11/1995 | Buchanan et al. .............. 52/198 |
| 5,552,121 | A | * | 9/1996 | Buchanan et al. ............ 422/171 |
| H2029 | H | * | 6/2002 | Comey et al. ................. 422/241 |

* cited by examiner

ZERO POLLUTION RECOVERY SYSTEM FOR SAFELY PRODUCING ANHYDROUS FLUORINE HYDRIDE

This application claims the priority benefits of Chinese Application CN 201110337061.3 filed Oct. 31, 2001 and PCT/CN11/82565 filed Nov. 21, 2011.

TECHNICAL FIELD OF THE INVENTION

The present invention relates to a zero pollution recovery system for safely producing anhydrous fluorine hydride, and in particular, to a zero pollution recovery system for safely producing anhydrous fluorine hydride which can absolutely guarantee the safety of its surrounding environments.

BACKGROUND OF THE INVENTION

Anhydrous fluorine hydride is an important industrial raw material, but is an extremely strong, toxic, and environment-harmful corrodent itself, the leakage of which will result in significant hazard to the populations and farm crops around the same. There is inevitable leakage of fluorine hydride during charging and discharging. Furthermore, in the case of inappropriate controlling of reaction temperature or speed, excessive pressure will be caused, resulting in automatic opening of relieve valve disposed at both ends of the reactor and releasing of fluorine hydrogen from both ends of the reactor, which causes environmental pollution and vast material wasting.

In view of the above reasons, how to find a way for safe and environment-friendly preparation and reuse of anhydrous fluorine hydride determines the prospect of the production industry of fluorine hydride and the protection of local environment and resources, as well as the carrying out and execution of the policies on clean production technologies and comprehensive resource utilization strongly advocated by our nation.

SUMMARY OF THE INVENTION

For solving the above technical problems, the present invention provides a zero pollution recovery system for safely producing anhydrous fluorine hydride, characterized in comprising: a compartment, a reactor for producing fluorine hydride, and a water tank; the reactor is disposed in the compartment; the water tank is disposed at the bottom of the compartment; absorption hoods are respectively disposed above both ends of the reactor for absorbing fluorine hydride gas; at least two absorption towers mutually connected in series via pipes are disposed above the compartment; water pipes connected with the water tank are respectively disposed at the top and bottom of the absorption tower; and a cooler and a receiver connected with the water tank is disposed on the pipes.

In comparison with the prior art, the present recovery system has the advantages of being able to control the range over which fluorine hydride can diffuse. That is, if there is excessive pressure in the reactor, the fluorine hydride thus escaped can be controlled within the compartment without leakage, thereby avoiding the pollution to environments while achieving effective recovery and reuse of fluorine hydride gas escaped.

In particular, if fluorine hydride gas escapes from both ends of the reactor, it will be sucked by the absorption hoods in a given direction and absorbed into the absorption towers, being prevented from diffusing in the compartment. If the temperature in the absorption tower is too high, the gas will be caused to swell toward outside, leading to unsafety and pollution. However, the arrangement of the cooler can reduce the temperature of fluorine hydride in the absorption tower in time, and guarantee the proceeding of the absorption.

Water pipes connected with the water tank are respectively disposed at the top and bottom of the absorption tower. The water pipe at the top sprays water onto the absorbed gas, so that it can continuously provide water required in the absorption tower, and at the same time increase the ability of the absorption tower in absorbing gas. The water pipe at the bottom can flow the water absorbing fluorine hydride into the water tank. Furthermore, a receiver is disposed so that the hydrofluoric acid absorbed by the absorption tower and cooled by the cooler can be flowed into the water tank. The amount of water in the tank is sufficient for absorbing all the fluorine hydride gas produced in the reaction. If there is any explosion in the reactor, the fluorine hydride gas thus produced can be completely absorbed by the water in the tank, ensuring the full containment of the escaped fluorine hydride and absolute safety of the surrounding environment. In addition, the absorbed hydrofluoric acid can be reused for resource saving and increased absorption efficiency.

Preferably, porous plastic beads are charged in the absorption tower.

Preferably, the absorption hood at each side is connected with three absorption tower.

The present invention further adopts the above technical features, which provides the following advantages: the water from the water pipe at the top of the absorption tower is sprayed onto the porous plastic beads, so that the absorption area of water and the porous plastic beads can be increased, the ability of the absorption tower in absorbing gas can be improved, and fluorine hydride can be absorbed by the absorption towers as much as possible; preferably, three absorption towers are arranged so that fluorine hydride gas can be sufficiently absorbed while saving energy and reducing wasting.

A sprayer and a detector for detecting and alarming are installed at the top of the compartment.

The present invention further adopts the above technical features which provide the following advantages: if the detector detects that the concentration of fluorine hydride in the compartment reaches a certain value, the sprayer will be automatically started and spray water onto the gas; the water absorbing the gas will flow into the water tank, and can be recycled as hydrofluoric acid, which further saves resources and increases absorption efficiency.

Preferably, blowers are disposed on the absorption hood and the gas pipes for sucking gas, and a blower speed controller is disposed on the absorption hood.

The present invention further adopts the above technical features which provide the following advantages: the arrangement of the blower accelerates the flowing of the gas, so that the gas can be more completely absorbed by the water; the blower speed controller can adjust the rotation speed of the blower, and control the sucking force of the blower, so that lower speed and smaller force are used under normal operation, and the sucking force is automatically tuned up for sucking the gas when the concentration of the fluorine hydride gas is relatively high, thereby achieving energy saving, environmental friendliness, and safety.

Preferably, an absorption tank is disposed on the compartment for absorbing remained gas after being absorbed in the absorption tower.

Preferably, a lime tank is disposed below the compartment, which is connected with the top and bottom of the absorption tank.

Preferably, the absorption tank is charged with porous plastic beads.

The present invention further adopts the above technical features which provide the following advantages: an absorption tank with lime water is arranged in the absorption tower; porous plastic beads are charged in the absorption tank; the top and bottom of the absorption tank are respectively connected with the lime tank; pipes are arranged at the top of the absorption tank for spraying water onto the porous plastic beads; and the lime water after absorbing the gas is recycled into the lime tank from the bottom thereof, so that a circulation is formed with the lime tank.

Preferably, a chimney is disposed on the absorption tank for evacuating the gas remained after being absorbed in the absorption tank.

The present invention further adopts the above technical features which provide the following advantages: the fluorine hydride gas and the water vapor after being absorbed in the absorption tower can be further absorbed; the remained gas can be evacuated through the chimney having a height of preferably 50 meters; and the concentration of fluorine hydride in the evacuated gas meets the emission standard, causes no pollution to the environment, and minimizes the harmful gas in the compartment.

Preferably, the absorption hood has a shape of semi-circle, circle or polygon.

The present invention further adopts the above technical features which provide the following advantages: the shape of the absorption hood is correspondingly designed based on the state of the hole of the relieve valve at both sides of the reactor, and can be semi-circle, circle or square, and other shape that can effectively absorb the fluorine hydride gas; this design facilitates improving the sucking force and sucking effect of the blower, saving energy, further improving the efficiency of absorbing fluorine hydride and reducing the pollution to the environment.

Preferably, the two sides of the compartment are respectively, symmetrically provided with: an observation window made of organic glass, a plastic steel door, and an air inlet for introducing air from outside.

The present invention further adopts the above technical features which provide the following advantages: the plastic-steel doors are arranged at both sides of the reactor in the present system, which are consisted of inner steel material and outer plastic material for anti-corrosion; the observation window made of organic glass is disposed for facilitating a technician to observe the situation inside the reactor; and the air inlet on both sides are arranged so that the fluorine hydride can be pushed into the absorption hood, and further contained in the compartment without leakage, thereby ensure absolutely safe production.

DETAILED DESCRIPTION OF PREFERRED EMBODIMENTS

The preferred examples of the present invention will be further described in detail in combination with the drawings.

Example 1

Figure 1:
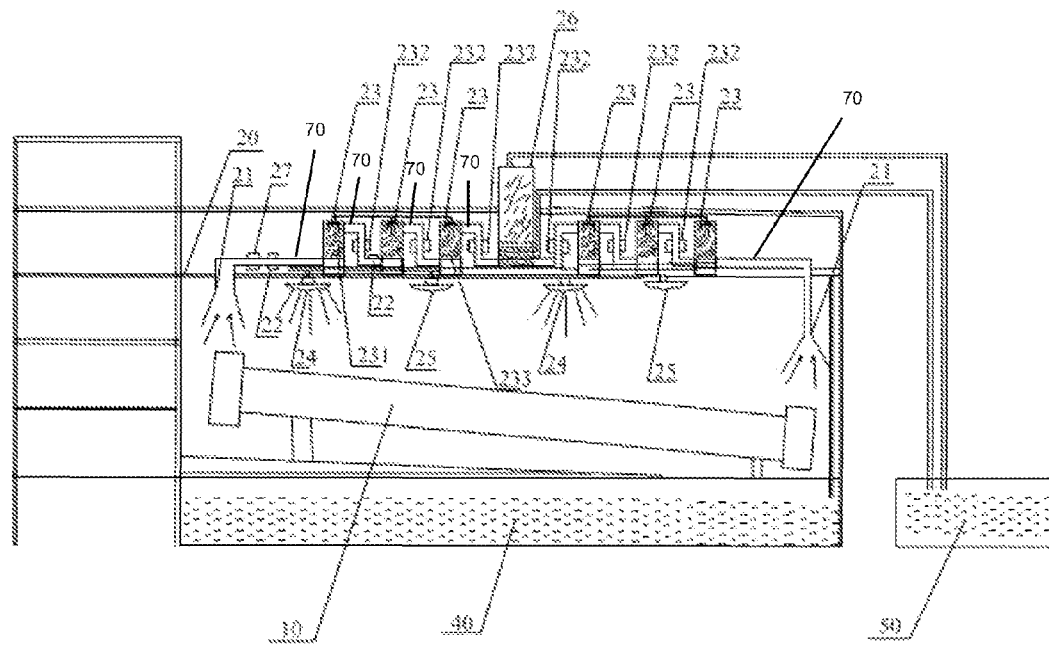
FIG. 1 is a schematically structural view of one example according to the present invention.

As shown in FIG. 1, a zero pollution recovery system for safely producing anhydrous fluorine hydride comprises: a compartment 20, a reactor 10 for producing fluorine hydride, and a water tank 40 disposed at the bottom; the reactor 10 is disposed in the compartment; absorption hoods 21 are respectively disposed above both ends of the reactor for absorbing fluorine hydride gas; at least two absorption towers 23 mutually connected in series via gas pipes 70 are disposed above the compartment 20; water pipes connected with the water tank are respectively disposed at the top and bottom of the absorption tower 23; and a cooler 232 and a receiver 233 connected with the water tank 40 are disposed on the gas pipes 70.

Porous plastic beads 231 are charged in the absorption tower 23.

A sprayer 24 and a detector 25 for detecting and alarming are installed at the top of the compartment 20.

Blowers 22 are disposed between the absorption hood 21 and the absorption tower 23, and between the absorption towers 23, for sucking the gas, and a blower speed controller 27 is disposed on the absorption hood 21.

An absorption tank 26 is disposed on the compartment 20 for absorbing remained gas after being absorbed in the absorption tower 23.

A lime tank 50 is disposed below the compartment 20, which is connected with the top and bottom of the absorption tank 26.

In particular, if fluorine hydride gas escapes from both ends of the reactor 10, it will be sucked by the absorption hoods 21 in a given direction and absorbed into the absorption towers 23, being prevented from diffusing in the compartment 20. If the temperature in the absorption tower 23 is too high, the gas will be caused to swell toward outside, leading to unsafety and pollution. However, the arrangement of the cooler 232 can reduce the temperature of fluorine hydride in the absorption tower 23 in time, and guarantee the proceeding of the absorption.

The water pipe at the top of the absorption tower 23 sprays water onto the absorbed gas in the porous plastic beads 231, so as to increase the contact surface area of water with the absorbed gas. Therefore, it can continuously provide water required in the absorption tower 23, and at the same time increase the ability of the absorption tower 23 in absorbing gas. The water pipe at the bottom can flow the water absorbing fluorine hydride into the water tank 40. Furthermore, the receiver 233 is disposed so that the hydrofluoric acid absorbed by the absorption tower 23 and cooled by the cooler can be flowed into the water tank 40. The absorbed hydrofluoric acid can be reused. Pipes are also disposed at the top of the absorption tank 26 for spraying water onto the porous plastic beads, and the absorbed lime water can be recycled into the lime tank 50 so as to form a circulation with the lime tank 50, saving resource and increasing the absorption efficiency.

Example 2

Figure 2:
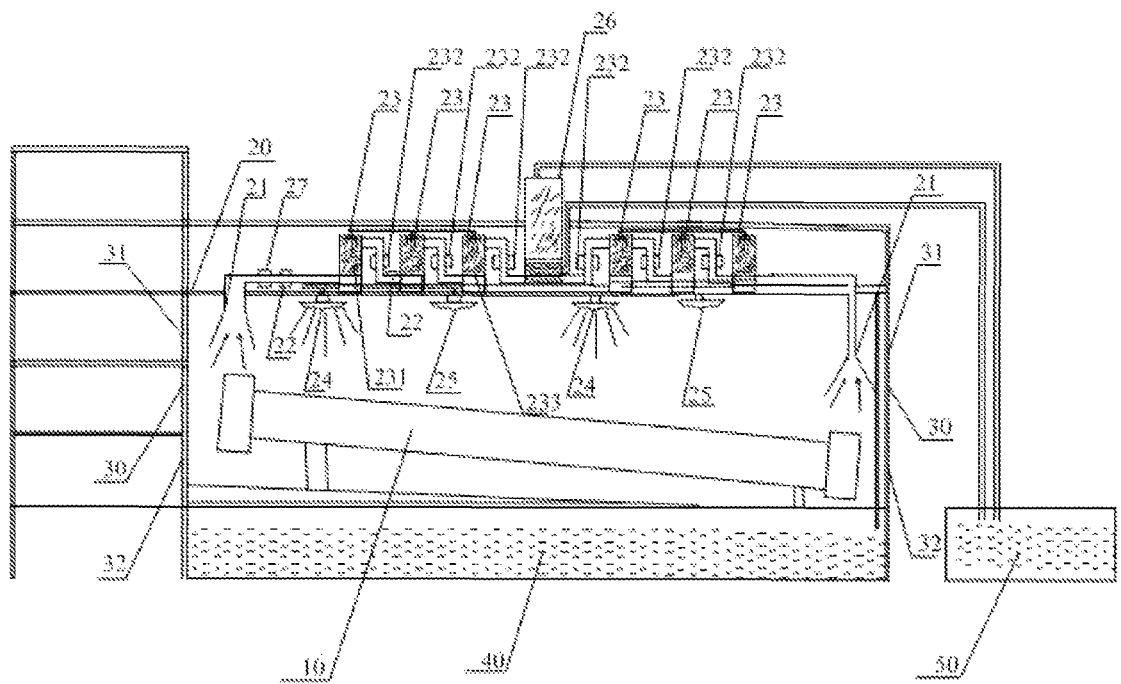
FIG. 2 is a schematically structural view of one example according to the present invention.

As shown in FIG. 2, the difference from those shown in example 1 lies in that the two sides of the compartment are respectively, symmetrically provided with: an observation window 31 made of organic glass, a plastic steel door 30, and an air inlet 32 for introducing air from outside.

The present invention further adopts the above technical features which provide the following advantages: the plastic-steel doors 30 consisted of inner steel material and outer plastic material for anti-corrosion; the observation window 31 made of organic glass can facilitate a technician to observe the situation inside the reactor; and the air inlet 32 on both sides are arranged so that the fluorine hydride can be pushed into the absorption hood 21, and further contained in the compartment without leakage, thereby ensure absolutely safe production.

Example 3

Figure 3:
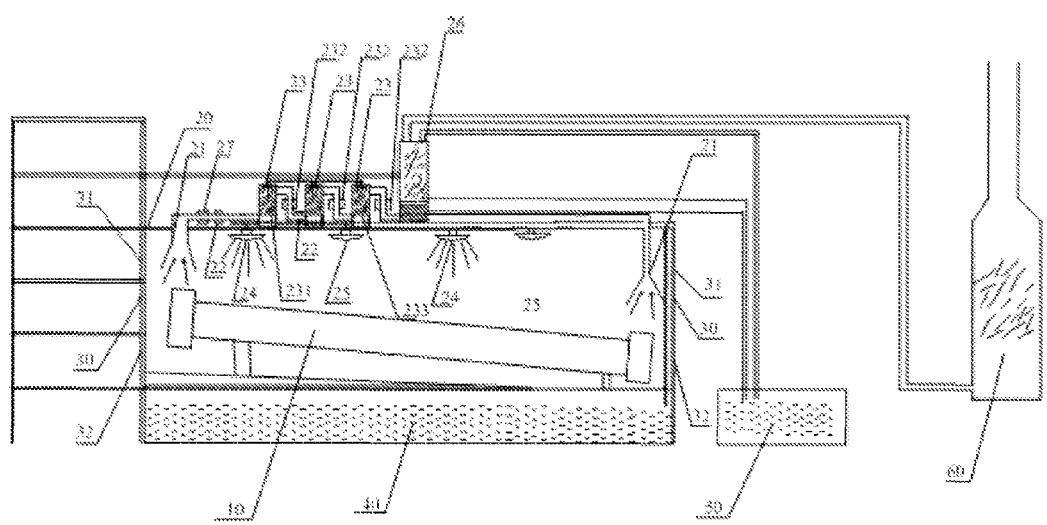
FIG. 3 is a schematically structural view of one example according to the present invention.

As shown in FIG. 3, the difference from those in FIG. 2 where the absorption tower at one side of the absorption hood 21 is omitted lies in that, a chimney 60 is disposed on the absorption tank 26. The concentration of fluorine hydride in the evacuated gas meets the emission standard, causes no pollution to the environment, and minimizes the harmful gas in the compartment.

The present invention further adopts the above technical features which have the following advantages: if there is any fluorine hydride gas unabsorbed, it can be evacuated via the chimney, so as to minimize the harmful gas in the compartment 20.

The present invention is further described above in detail in combination with specific preferred embodiment, but is not intended to be limited to those descriptions. Several simple modifications or alternatives can be made by those skilled in the art without being departing from the concept of the present invention, which should be also considered as falling within the scope of the present invention.

What is claimed is:

1. A zero pollution recovery system for safely producing anhydrous fluorine hydride, comprising:
    a compartment;
    a reactor for producing fluorine hydride arranged in the compartment;
    a water tank arranged in the compartment and below the reactor;
    two absorption hoods, each absorption hood respectively arranged above one of two opposite ends of the reactor for withdrawing fluorine hydride gas from the compartment;
    at least two absorption towers arranged above the compartment and connected to the absorption hoods for absorbing fluorine hydride from the withdrawn gas, where the absorption towers are mutually connected in series via gas pipes; and
    a cooler arranged on the gas pipes.

2. The zero pollution recovery system for safely producing anhydrous fluorine hydride according to claim 1, wherein a sprayer and a detector for detecting fluorine hydride and alarming are installed at the top of the compartment.

3. The zero pollution recovery system for safely producing anhydrous fluorine hydride according to claim 1, wherein a blower is disposed between each absorption hood and the absorption towers for transferring the withdrawn fluorine hydride gas from the absorption hoods to the absorption towers, and a blower speed controller is further disposed adjacent at least one absorption hood.

4. The zero pollution recovery system for safely producing anhydrous fluorine hydride according to claim 1, wherein an absorption tank for absorbing any fluorine hydride gas remaining after being absorbed by the absorption towers is further disposed on the compartment.

5. The zero pollution recovery system for safely producing anhydrous fluorine hydride according to claim 4, further comprising a lime tank arranged below the compartment, and wherein a top and bottom of the absorption tank are respectively connected with the lime tank.

6. The zero pollution recovery system for safely producing anhydrous fluorine hydride according to claim 4, wherein the absorption towers and the absorption tank contain porous plastic beads.

7. The zero pollution recovery system for safely producing anhydrous fluorine hydride according to claim 6, wherein a chimney is disposed on the absorption tank for evacuating any fluorine hydride gas remaining after being absorbed by the absorption tank.

8. The zero pollution recovery system for safely producing anhydrous fluorine hydride according to claim 1, wherein the absorption hoods have a shape of semi-circle, circle or polygon.

9. The zero pollution recovery system for safely producing anhydrous fluorine hydride according to claim 1, wherein each of two opposite sides of the compartment are symmetrically provided with an observation window made of organic glass, a plastic-steel door, and an air inlet for introducing air from outside.

10. The zero pollution recovery system for safely producing anhydrous fluorine hydride according to claim 1, wherein the at least two absorption towers comprise six absorption towers, where each of the absorption hoods is connected with three of the six absorption towers, respectively.

11. The zero pollution recovery system for safely producing anhydrous fluorine hydride according to claim 2, wherein the at least two absorption towers comprise six absorption towers, where each of the absorption hoods is connected with three of the six absorption towers, respectively.

* * * * *